United States Patent [19]
Elliott

[11] 3,853,629
[45] Dec. 10, 1974

[54] BATTERY HAVING LAMINATED WRAPPER MEMBER WHICH INCLUDES GAS VENTING PASSAGEWAY

[75] Inventor: Ronald C. Elliott, Appleton, Wis.
[73] Assignee: ESB Incorporated, Philadelphia, Pa.
[22] Filed: Dec. 3, 1973
[21] Appl. No.: 421,155

[52] U.S. Cl. ................... 136/111, 136/132, 136/177
[51] Int. Cl. ............................................. H01m 1/06
[58] Field of Search ................... 136/177, 169–170, 136/180, 111, 166–167, 163, 132–133, 107

[56] References Cited
UNITED STATES PATENTS

| | | | |
|---|---|---|---|
| 2,759,038 | 8/1956 | Marsal | 136/136 |
| 2,870,235 | 1/1959 | Soltis | 136/111 |
| 3,489,616 | 1/1970 | Fangradt et al. | 136/107 |
| 3,741,812 | 6/1973 | Spellman et al. | 136/107 |
| 3,741,814 | 6/1973 | Bilhorn | 136/111 |

Primary Examiner—Anthony Skapars

[57] ABSTRACT

A battery has a wrapper member comprising the combination of an inner layer which is pervious to gases generated by the cell and an outer layer which is impervious to liquids and which is less pervious than the inner layer to the gases generated by the cell. The inner and outer layers are laminated to one another throughout some but not all of their coextensive surfaces, with the unlaminated portions providing a passageway between the two layers for the venting of gases generated on the interior of the battery; the passageway communicates with the exterior of the battery. Preferably the inner and outer layers have coextensive surfaces which cover the entire area enclosed by the peripheral seal of the battery, and the inner layer extends into the area of and forms a component of the peripheral seal; in that case the gas passageway may extend to the area above the seal. Preferably the inner layer is an electrically conductive plastic and the outer layer is a metal.

6 Claims, 10 Drawing Figures

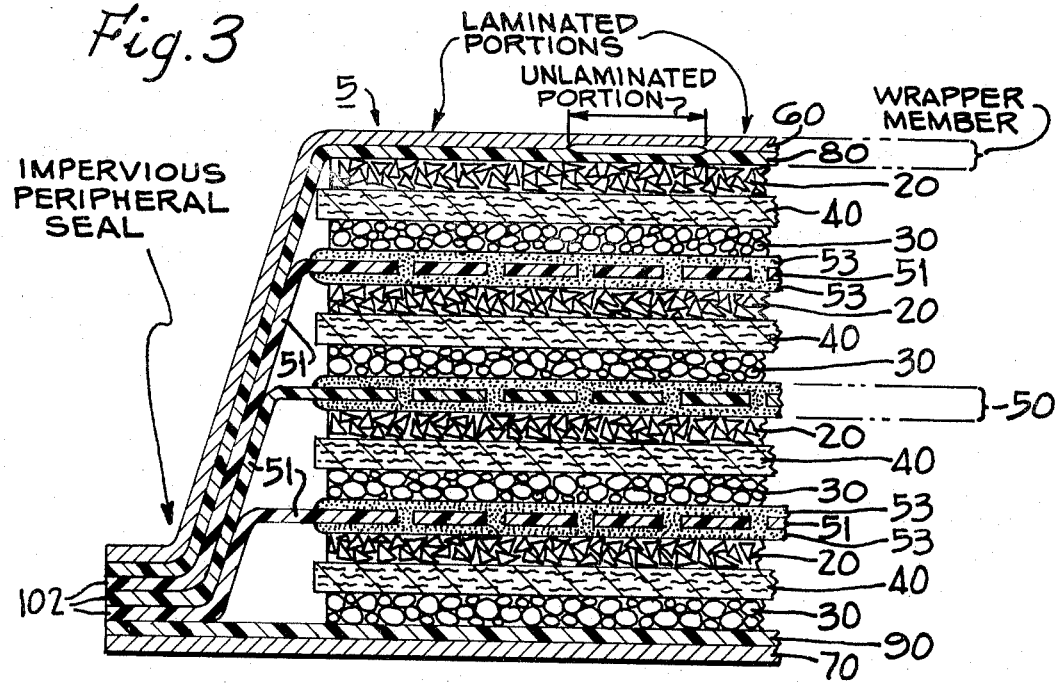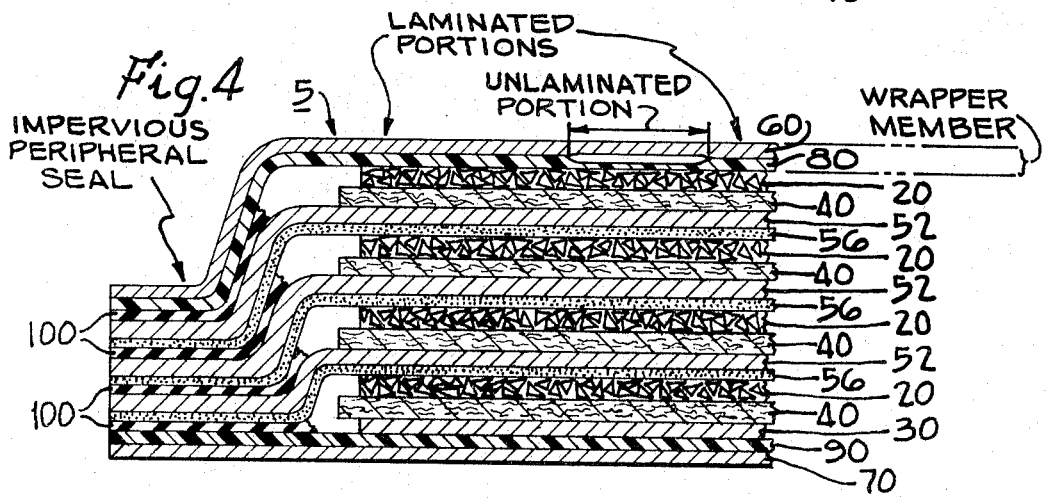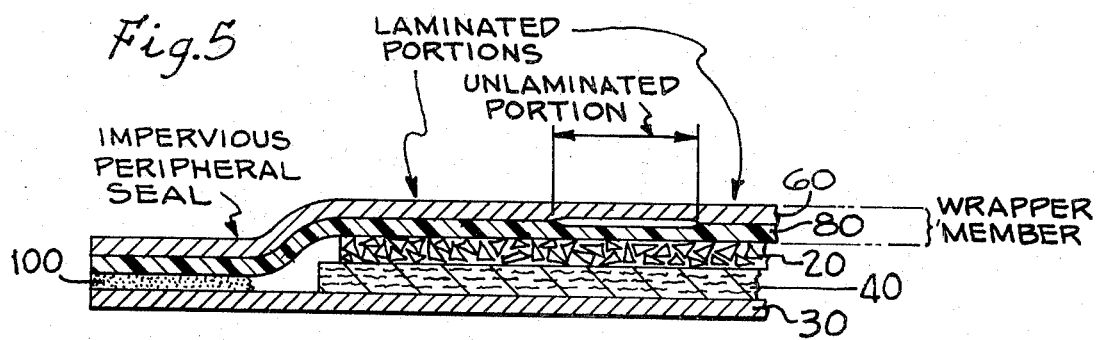

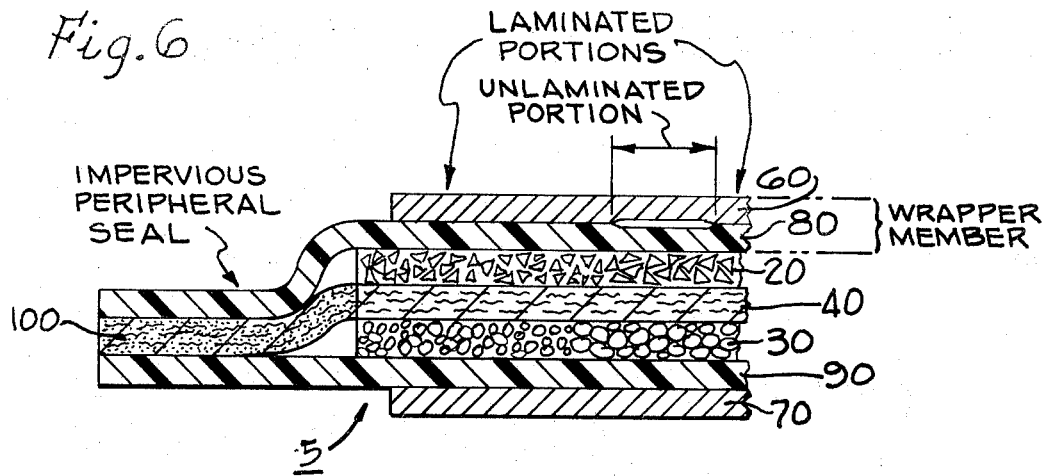
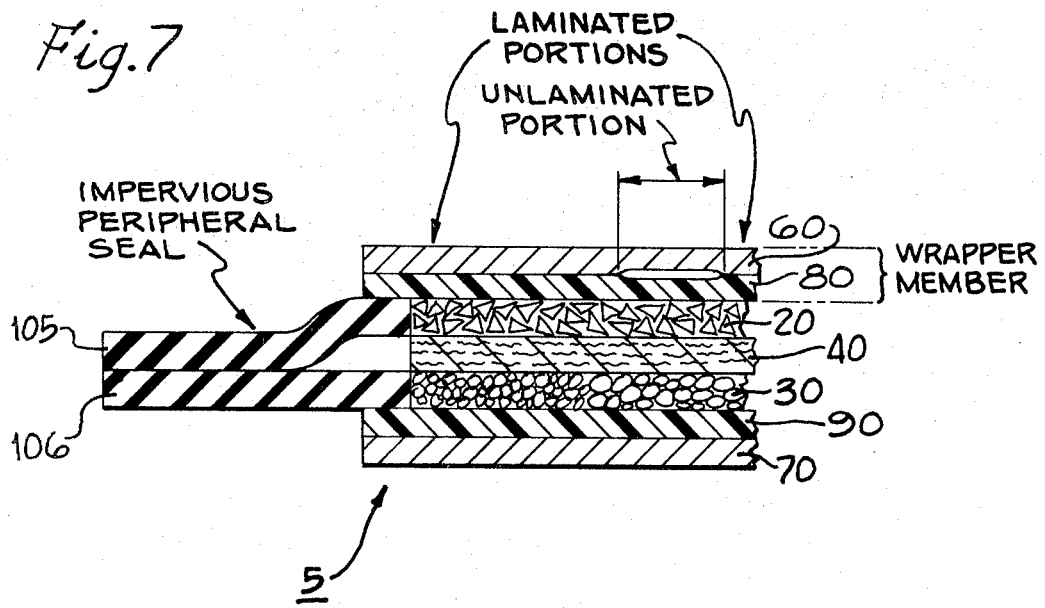

BATTERY HAVING LAMINATED WRAPPER MEMBER WHICH INCLUDES GAS VENTING PASSAGEWAY

BACKGROUND OF THE INVENTION

U.S. Pat. No. 3,741,814 illustrates a battery having a pair of wrapper pieces each of which is a laminate; the inner layer is an electrically conductive plastic and the outer layer is a metal. The conductive plastic in each of the laminates is in contact with an end electrode of the battery and functions as a current collector; the outer metal functions as a terminal and current conductor. The lamination between the conductive plastic and metal in each wrapper piece minimizes the electrical resistance and thus the internal power losses across the interface between the two components. The two wrapper pieces are closed around their perimeters to produce a liquid impervious seal around the periphery of the battery, and the entire area inside this peripheral seal is covered by the laminate of conductive plastic and metal. The electrically conductive plastic is likely to be pervious to certain gases which may be generated inside the battery, e.g., hydrogen gas, but the metal is much less pervious to such gases. As a result, the combination of the peripheral seal and the enclosed laminated prevents or severely limits the escape of such gases. It has been determined to be desirable to provide some means for adequately venting internally generated gases to the exterior of the battery.

In U. S. Pat. No. 2,870,235 a battery is described which battery is enclosed in an envelope comprising the combination of three materials. The innermost layer, which is in direct contact with the positive terminal electrode of the battery, is an electrically conductive plastic film. The middle layer is a metal foil which does not extend across the entire surface of the electrically conductive plastic. The outermost layer is an electrically nonconductive plastic film. The metal foil is not sealed or laminated to either the conductive plastic film or the nonconductive plastic film.

Batteries have previously been designed in which a hole extending between the interior and exterior of the battery container was covered by a member which is pervious to gases but impervious to liquids. These members were included to permit gases to enter or leave the battery while preventing liquids from doing the same. In some cases these members were designed to be permeable to some gases but not to other gases.

In the U.S. Pat. No. 2,693,499, for example, a liquid impervious diaphragm is placed in the interior of the cell and over a hole in the bottom of the battery container. The diaphram, which may be made from a plastic material such as a polyvinyl chloride or polyethylene, is much more permeable to hydrogen than it is to oxygen and this characteristic of the material is used to control the relative amounts of hydrogen and oxygen inside the cell and hence to affect the state of charge of the electrodes.

In U.S. Pat. No. 2,759,038 an air-depolarized cell is provided with a covering which extends over the exterior of vent openings or breather ports. This covering, which may be made from polyethylene or ethyl cellulose, prevents moisture from leaving the cell but permits the required oxygen from the air to enter. The covering also substantially prevents nitrogen and carbon dioxide from entering the cell.

A hole communicating between the exterior of a battery has also been covered with a material or foil which is impervious to both gases and liquids. An example of such a construction is shown in U.S. Pat. No. 3,489,616. In that patent the foil is used to seal aeration holes in an air-depolarized cell until it is desired to activate the cell, at which time the foil is torn off.

In U.S. Pat. No. 3,741,812 there is shown a cylindrical cell having a metal top which has a hole therein. A gas pervious, liquid impervious member is secured to the interior surface of the top in a manner which provides a liquid-tight closure around the hole. The gas pervious, liquid impervious member may be an electrically conductive plastic. Gases generated inside the cell are vented to the exterior by permeating through the gas pervious member and then passing out through the hole in the metal top.

U.S. Pat. No. 3,741,813 also shows a cylindrical cell having a metal top which has a hole therein. A gas pervious, liquid impervious member is secured to the exterior surface of the top in a manner which provides a liquid-tight closure around the hole. Gases generated inside the cell are vented to the exterior by passing through the hole in the metal top and then permeating through the gas pervious member.

SUMMARY OF THE INVENTION

The invention concerns a battery having at least one wrapper member comprising the combination of an inner layer which is pervious to gases generated by the cell and an outer layer which is impervious to liquids and which is less pervious than the inner layer to the gases generated by the cell.

Unlike the battery shown in U.S. Pat. No. 3,741,814 in which the inner plastic layer and the outer metal layer are laminated together over all of the area enclosed by the peripheral seal and in which there is little or no opportunity for gases to vent through the wrapper piece, this invention provides a wrapper member in which the inner and outer layers are laminated to one another throughout some but not all of their coextensive surfaces. The result is an improvement in which the unlaminated portions of the two layers provide a passageway between the two layers for the venting of gases generated on the interior of the battery. This passageway communicates with the exterior of the battery.

Preferably the inner and outer layers have coextensive surfaces which cover the entire area enclosed by the peripheral seal of the battery. The inner layer may extend into the area of and form a component of the peripheral seal, in which case the gas passageway may extend to the area above the peripheral impervious seal.

Preferably the inner layer is an electrically conductive plastic and the outer layer is a conductive metal. In that case there is good electrical conductivity across the interface between the plastic and metal in the portions where the lamination exists.

BRIEF DESCRIPTION OF THE DRAWINGS

FIGS. 3 through 9 are cross-secions of batteries whose construction features differ in some respect from those of the battery shown in FIGS. 1 and 2.

DESCRIPTION OF THE PREFERRED EMBODIMENTS

Figure 1:
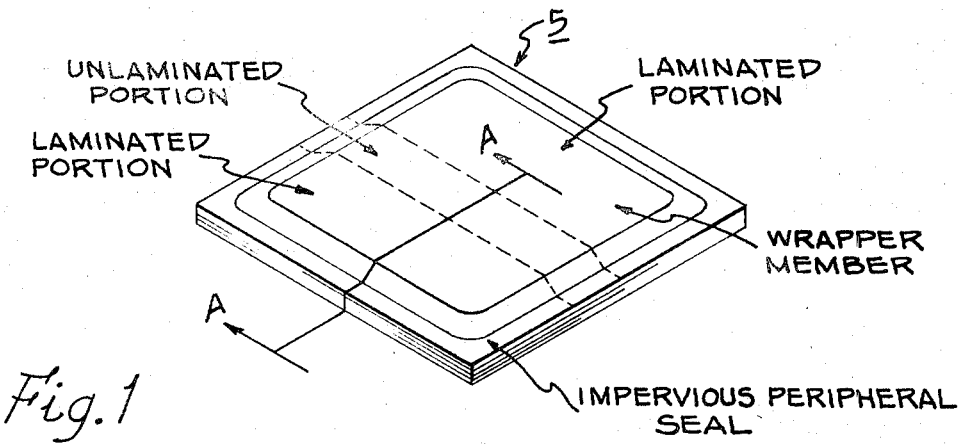
FIG. 1 is an oblique view of a battery having a wrapper member whose component layers are laminated together in some portions and are not laminated together in at least one other portion. The unlaminated portion of the two layers provides a passageway between the two layers for the venting of gases generated on the interior of the battery.
Figure 2:
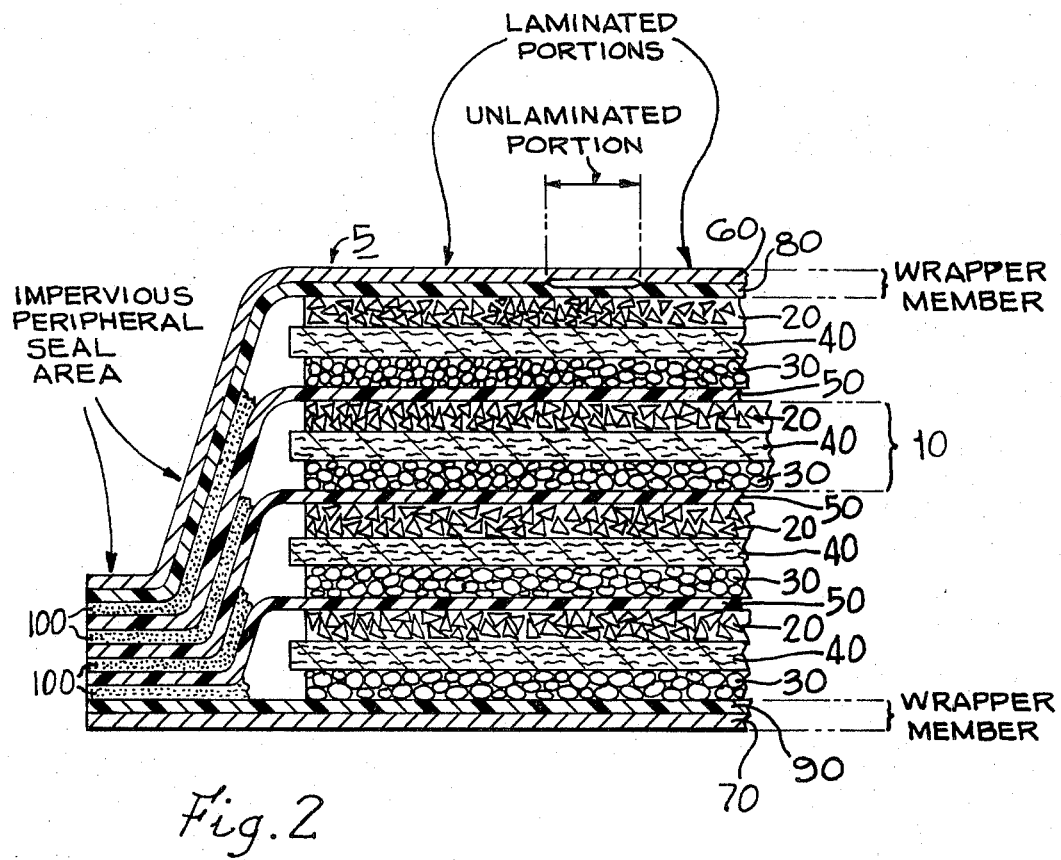
FIG. 2 is a cross-section of the battery shown in FIG. 1 taken along the line A—A of FIG. 1. The thickness of the battery is shown greatly magnified for the purposes of illustration.

FIGS. 1 and 2 illustrate a multicell battery 5 containing cells 10 each of which comprises a positive electrode 20 separated from a negative electrode 30 by an electrolyte-containing layer 40. The cells are spaced apart from each other but electrically connected together by a conductive intercell connector 50, which intercell connector 50 is shown in FIGS. 1 and 2 as being made from an electrically conductive plastic material.

The battery shown in FIGS. 1 and 2 also includes a pair of wrapper members which enclose the cells 10. The wrapper members are sealed to provide a seal which is impervious to liquid around the periphery of the cells.

The battery made according to the present invention includes at least one wrapper member comprising the combination of an inner layer which is pervious to gases generated by the cell and an outer layer which is impervious to liquids and which is less pervious than the inner layer to the gases generated by the cell. The wrapper members extend over at least some of the area enclosed by the peripheral seal. The inner and outer layers are laminated to one another throughout some but not all of their coextensive areas. The unlaminated portions provide a passageway between the two layers which communicates with the exterior of the battery and which provides an outlet or vent for gases generated on the interior of the battery.

It will be apparent that if proper combinations of materials are made, the vent may be provided in a wrapper member at the top and/or the bottom of the battery. For simplicity in illustration and description the remaining explanation of the invention will refer to a battery in which the upper wrapper member having the vent feature feature is present only at the top of the battery. It should be understood, however, that the venting wrapper which is central to this invention may appear at the top and/or the bottom of the battery.

Referring once again to the battery 5 which appears in FIGS. 1 and 2, the wrapper member at the top of the battery comprises an inner layer 80 made from an electrically conductive plastic which is pervious to the gases generated by the cell and an outer metal layer 60 which is impervious to liquids. Although not necessarily totally impervious to the gases generated by the cell, this layer 60 is less pervious than the plastic layer 80 to such gases. The wrapper member at the bottom of the battery comprises an electrically conductive plastic layer 90 and a metal layer 70 comparable to layers 80 and 60, respectively, in the top wrapper member. The two layers in the top wrapper member have coextensive surfaces which cover the entire area enclosed by the peripheral seal. The wrapper member extends into the area of and forms a component of the peripheral seal; the remaining components which make up the peripheral seal are extensions of the intercell connectors 50, the bottom wrapper member, and deposits of electrically nonconductive adhesive 100, as shown in FIG. 2.

As shown in FIGS. 1 and 2, the inner layer 80 is laminated to some but not all of the outer layer 60 throughout their coextensive surfaces. The laminated portions, which prevent or severely limit the venting of gases over their coextensive areas, provide maximum electrical conductivity across their interfaces as a result of the lamination. The unlaminated portions provide a passageway between two layers which communicates with the exterior of the battery to provide an outlet or vent for gases generated on the interior of the battery. This gas passageway or vent extends to the area above the peripheral seal in the battery shown in FIGS. 1 and 2.

To function as required by this invention the inner layer 80 must be pervious to certain gases. The layer 80 may function by a mechanism in which the gases are dissolved and diffused in the layer. The rate at which particular gas molecules which must pass through the layer 80, or be prevented from passing through, should be considered taking into account the particular electro-chemical system included in the cell. Will cell systems in which an oxidizing compound is contained inside the cell, the usual desired result is to vent gases produced by discharge or overcharge from the inside to the outside of the cell. The layer 80 must have the property of being pervious to certain gases but impervious to liquids. Materials having this property include polyvinyl chloride, polyethylene, ethyl cellulose, and other polymeric materials.

To function as required by this invention the layer 60 must be impervious to liquids and relatively impervious to those gases which are to be vented inside the battery (although not necessarily impervious to all gases per se). Many metals and some other materials and combinations of materials will have this property.

The required lamination may be achieved in a number of ways including heat laminations. Alternatively, the lamination may be achieved through the use of some adhesive material positioned between the inner and outer layers. To achieve the unlaminated portions of the venting wrapper member, the heat and/or intermediate adhesive may be omitted over the affected area, and any pressure applied elsewhere to produce lamination may be omitted or reduced.

The number, widths, lengths, and configurations of the unlaminated portions of the wrapper member can be optimized only by experiment. The optimum will depend upon a number of factors, taken in combination with each other, such as: the size, solubility, and/or diffusion rate of the gas molecules to be vented; the rate at which the gas molecules are to be vented during storage, international discharge, or recharge of the battery in a particular environment; the properties of the inner layer, which affect the ease or difficulty with which the gases will pass through that layer; and the ease or difficulty with which the gases pass along the unlaminated passageway, a consideration which will be affected by the clearance at the interface between the two unlaminated surfaces as well as the surface properties of the two layers at that interface. For the sake of simplicity in explaining the invention the drawings illustrate a single unlaminated gas passageway running in a straight line along the center of the battery and extending from and opening at opposite exterior edges of the battery; this embodiment is intended only to be illustrative of a great many alternatives, all of which are within the scope of this invention, in which there are numerous variations and combinations of the factors described above and of the number, width length, and configuration of the gas passageways.

While FIG. 1 shows the gas-venting passageway extending to the edge of the battery and into the area of the peripheral seal, this feature is not a requirement of this invention. The opening of the passageway to the atmosphere outside the battery may be located at any convenient position, including inside or beyond the peripheral seal.

A battery having construction features different in some respects from those shown in FIGS. 1 and 2 illustrated in cross-section in FIG. 3. In FIG. 3 the intercell connector layers 50 comprise pieces of electrically nonconductive plastic 51 through holes in which an electrically conductive material 53 extends to provide electrical conductivity between the positive electrode 20 of one cell and the negative electrode 30 of the adjacent cell. The nonconductive plastic components 51 are extended beyond the edges of the electrodes to be heat sealed with each other and with the layers 80 and 90 of the wrapper members to produce the peripheral seal. The upper and lower wrapper members shown in FIG. 3 are identical with those shown in FIG. 2.

In FIG. 4 the multicell battery 5 is provided with negative electrodes 30 comprising strips of electrochemically reactive metal 52 (e.g., zinc) some of which extend beyond the edges of the positive electrodes 20 and the electrolyte-containing layers 40. The intercell connector layers comprise deposits of electrically conductive, electrochemically nonreactive material 56 which also extends beyond the edges of the positive electrodes 20 and electrolyte-containing layers 40. Deposits of electrically nonconductive adhesive 100 are used as shown to provide peripheral seals around each cell by sealing with the layers 80, 90, 52, and 56. The upper and lower wrapper members shown in FIGS. 4 are identical with those shown in FIGS. 2 and 3.

The battery 5 shown in FIG. 5 comprises only a single cell and has an upper wrapper member identical with the one shown in FIG. 2. The lower wrapper member, which extends beyond the positive electrode 20 and electrolyte-containing layer 40 to be sealed with nonconductive adhesive 100 and provide the peripheral seal, comprises a sheet or strip of electrochemically reactive metal (e.g., zinc) the inner surface of which is used as the cell's negative electrode.

The single cell battery 5 shown in cross-section in FIG. 6 has upper and lower wrapper members comprising inner layers of electrically conductive plastic 80 and 90, respectively, and outer layers of metal 60 and 70 respectively. The conductive plastic layers 80 and 90, but not the metal layers 60 and 70, extend beyond the edges of the electrodes and are used as components of the peripheral seal together with a deposit of electrically nonconductive adhesive 100 impregnated into an extension of the separator 40. The upper wrapper member contains laminated and unlaminated portions similar to those appearing in FIG. 2 to provide the required gas vent or passageway.

The single cell battery 5 shown in cross-section in FIG. 7 has upper and lower wrapper members comprising electrically conductive, gas-pervious plastic layers 80 and 90, respectively, and metal layers 60 and 70, respectively. The surfaces of the layers 80 and 90 are coextensive with the surfaces of layers 60 and 70, respectively. The innermost surfaces of layers 80 and 90 extend beyond the edges of the electrodes 20 and 30 where they are heat sealed to electrically nonconductive members 105 and 106, respectively, and those members 105 and 106 are in turn extended further outward and heat sealed together to provide the peripheral seal. The upper wrapper member contains laminated and unlaminated portions similar to those appearing in FIG. 2 to provide the required gas vent or passageway.

Figure 8:
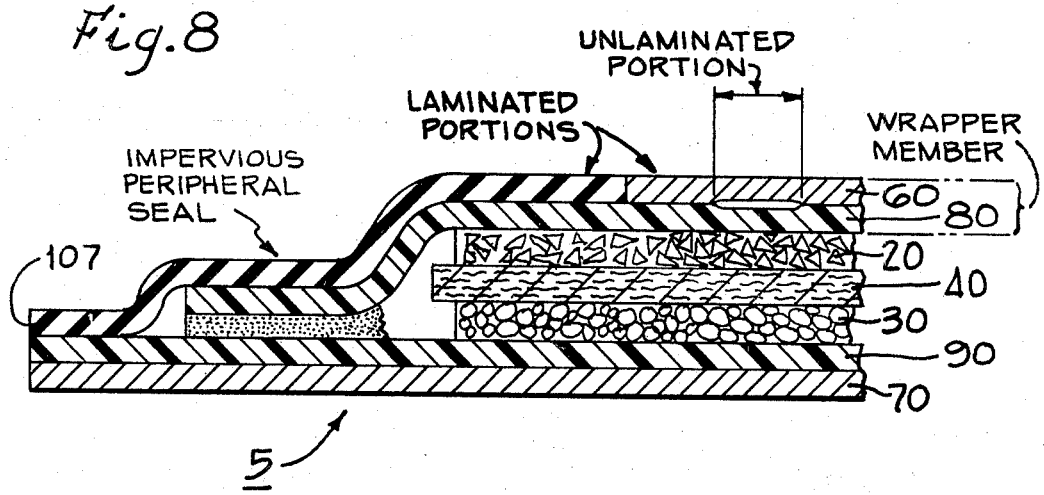

The single cell battery 5 shown in cross-section in FIG. 8 has a lower wrapper member similar to that shown in FIG. 2 and which is sealed with the upper wrapper member by an electrically nonconductive adhesive 100 to provide the peripheral seal. The upper wrapper member has an inner layer 80 made from a gas-pervious, electrically conductive plastic material. The outer layers of the upper wrapper member include an open-centered component 107 made from an electrically nonconductive material and a centrally located layer of metal 60, both of which are relatively gasimperious. All of the inner surface of the component 107 is laminated to the top of layer 80, while some but not all of the metal layer 60 is laminated to the top of layer 80. The required gas vent or passageway is between metal layer 60 and plastic layer 80, as in FIG. 2. The construction shown in FIG. 8 has the characteristic of requiring less metal 60 and exposing a smaller conductive area than the counterpart upper wrapper member shown in FIG. 2. Also the layers 70, 90, and 107 have been extended beyond the edges of layer 80 and adhesive 100 so that layers 107 and 90 may be sealed together and produce an additional peripheral seal.

Figure 9:
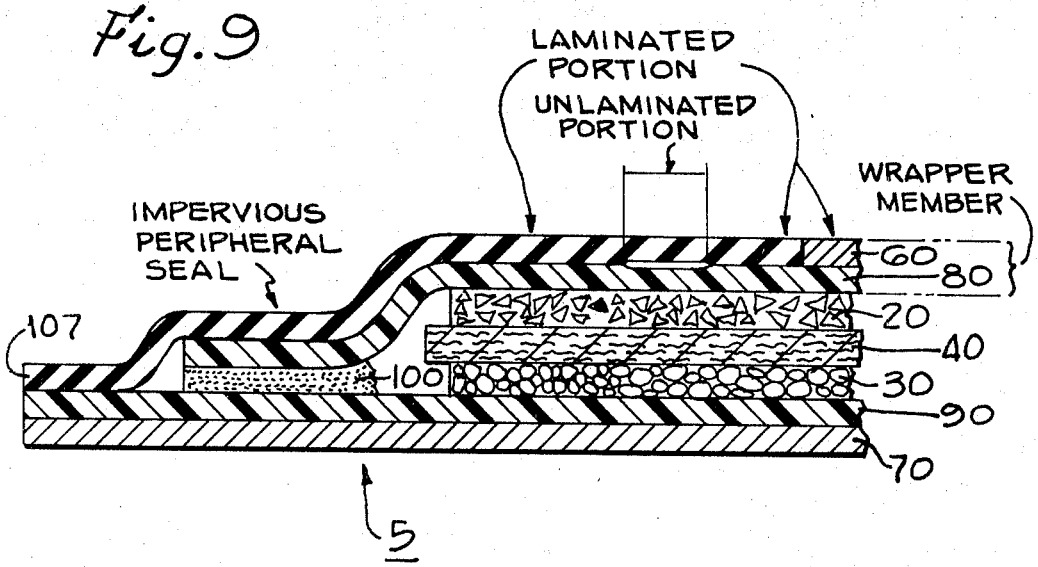

FIG. 9 shows a battery similar to the one appearing in FIG. 8 except that the unlaminated portion of the upper wrapper member which provides the required gas passageway occurs between layer 80 and layer 107. The construction shown in FIG. 9 has the characteristic of having the metal layer 60 and the conductive plastic layer 80 be laminated together across the entire interface of their coextensive surfaces, thereby minimizing the electrical resistance between those two layers.

The effectiveness of the passageways in venting gases and the consequences of that venting on properties of the batteries have been demonstrated.

Figure 10:
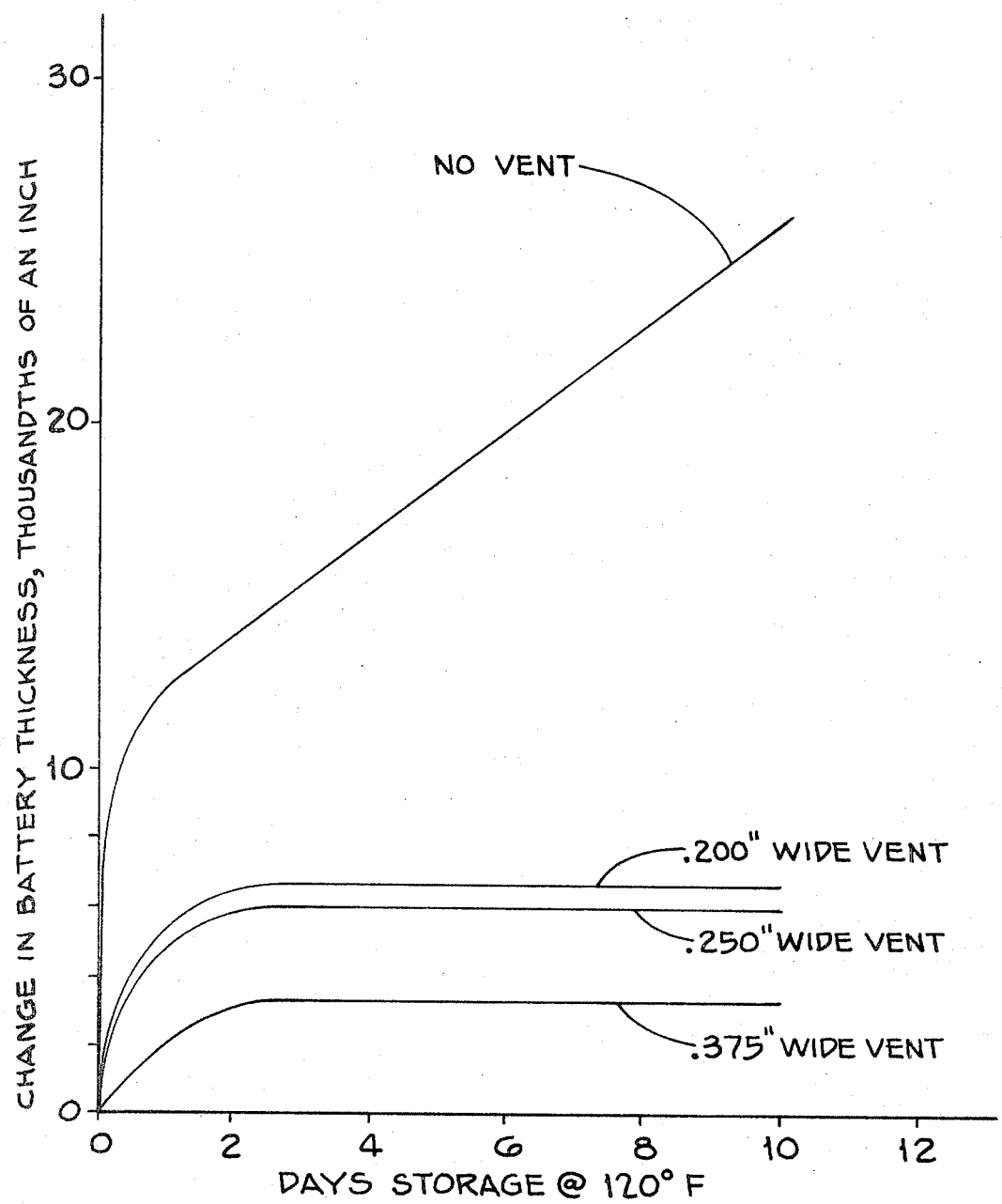
FIG. 10 shows the effects on battery thickness of permitting the gases to vent through the wrapper members.

One of the consequences of not permitting the battery gases to vent adequately is an increase in the thickness of the battery due to internal gas accumulation. FIG. 10 demonstrates the change in battery thickness with the passage of time for batteries having no vent, one vent 0.200 inchs wide, one vent 0.250 inches wide, and one vent 0.375 inches wide.

The ability of the battery to vent gases also has an effect upon the electrical discharge characteristics of the battery after a period of time in storage. The following table shows the number of discharge pulses (made under a prescribed and common pulse regime) obtained from batteries having laminated wrapper members at the top and bottom ends of the battery, each wrapper member at 75°F having no vent and otherwise comparable batteries having a single vent the width of which was 0.200 inches or 0.375 inches.

| Battery Description | Number of Pulses | | | |
| --- | --- | --- | --- | --- |
| | Newly made batteries | | After storage 14 days at 120°F | |
| | Mean | Range | Mean | Range |
| Non-vented | 95 | 94–96 | 61 | 27–87 |
| Vented, - .200" wide | 108 | 95–116 | 113 | 109–122 |
| Vented, - .375" wide | 99 | 92–105 | 111 | -111- |

While it is preferred to employ the LeClanche electrochemical system (comprising manganese dioxide positive active material, zinc negative active material, and an electrolyte comprising ammonium chloride and/or zinc chloride), the battery 5 of this invention may employ a wide variety of positive and negative electrode materials and a wide variety of electrochemical systems including both primary and secondary systems. Among the positive electrode materials are such commonly used inorganic metal oxides as manganese dioxide, lead dioxide, nickel oxyhydroxide, mercuric oxide, and silver oxide, inorganic metal halides such as silver chloride and lead chloride, and organic materials capable of being reduced such as dinitrobenzene and azodicarbonamide compounds. Among the negative electrode materials are such commonly used metals as zinc, aluminum, magnesium, lead, cadmium, and iron, This invention may with appropriate electrodes employ the electrolytes commonly used in the LeClanche system (ammonium chloride and/or zinc chloride), various alkaline electrolytes such as the hydroxides or potassium, sodium, and/or lithium, acidic electrolytes such as sulfuric or phosphoric acid, nonaqueous electrolytes, the electrolytes of course being chosen to be compatible with the positive and negative electrodes.

Among the wide variety of electrochemical systems which may be used in the battery 5 are those in which the positive electrodes comprise managanese dioxide, the negative electrodes comprise metals such as zinc, aluminum, or magnesium, the electrolyte substantially comprises an acidic solution or inorganic salts. Another commonly known system useful in the battery 5 in the alkaline manganese system in which the positive electrodes comprise manganese dioxide, the negative electrodes comprise zinc, and the electrolyte substantially comprises a solution of potassium hydroxide. Other aqueous electrolyte systems including those of nickel-zinc, mercury-zinc, mercury-cadmium, and nickel-cadmium may also be used. Systems employing organic positive electrodes and acidic electrolytes may also be used, including rechargeable systems using azodicarbonamide compound electrodes and LeClanche electrolyte.

I claim:

1. An improvement in a battery comprising
   a. at least one cell, the cell comprising a positive electrode separated from a negative electrode by an electrolyte-containing layer, the cell being sealed at its periphery by a liquid and moisture impervious seal, and
   b. at least one wrapper member secured to the cell and extending over at least some of the area enclosed by the peripheral seal, the wrapper member comprising the combination of
      i. an inner layer which faces the cell and which is pervious to gases generated by the cell, and
      ii. an outer layer which is impervious to liquids and which is less pervious than the inner layer to the gases generated by the cell,
   wherein the improvement provides a gas-venting passageway, the improvement comprising the lamination of some but not all of the coextensive surfaces of the inner and outer layers, the unlaminated portions of the two layers providing a passageway between the two layers for the venting of gases generated by the cell, the passageway being situated beyond the inside face of the inner layer so that gases generated by the cell must first pass through the first layer before reaching the passageway, the passageway communicating with the exterior of the battery.

2. The battery of claim 1 in which the inner and outer layers have coextensive surfaces which cover the entire area enclosed by the peripheral seal.

3. The battery of claim 2 in which the inner layer extends into the area of and forms a component of the peripheral impervious seal and in which the gas passageway extends to the area above the peripheral impervious seal.

4. The battery of claim 1 in which the inner layer is an electrically conductive plastic and the outer layer is a metal.

5. The battery of claim 2 in which the inner layer is an electrically conductive plastic and the outer layer is a metal.

6. The battery of claim 3 in which the inner layer is an electrically conductive plastic and the outer layer is a metal.

* * * * *